(12) United States Patent
Geiger

(10) Patent No.: US 6,832,457 B2
(45) Date of Patent: Dec. 21, 2004

(54) WINDOW ASSEMBLY

(75) Inventor: Charles Wayne Geiger, La Crescenta, CA (US)

(73) Assignee: Hehr International, Inc., Los Angeles, CA (US)

( * ) Notice: Subject to any disclaimer, the term of this patent is extended or adjusted under 35 U.S.C. 154(b) by 95 days.

(21) Appl. No.: 10/252,764

(22) Filed: Sep. 23, 2002

(65) Prior Publication Data

US 2003/0056449 A1 Mar. 27, 2003

Related U.S. Application Data

(60) Provisional application No. 60/325,686, filed on Sep. 27, 2001.

(51) Int. Cl.[7] ................................................ E04C 2/38
(52) U.S. Cl. .................. 52/656.5; 52/204.7; 52/204.69; 52/204.64; 52/204.62; 52/204.53; 52/202; 52/203; 49/463
(58) Field of Search ............................. 52/656.5, 204.7, 52/204.69, 204.64, 204.62, 204.53, 202, 203; 49/463

(56) References Cited

U.S. PATENT DOCUMENTS 4,121,394 A * 10/1978 Brooks ........................ 52/203
4,620,609 A * 11/1986 Elsten ......................... 52/202
6,012,257 A * 1/2000 Caplette ....................... 52/202
6,047,500 A * 4/2000 Caplette ....................... 49/466

* cited by examiner

Primary Examiner—Carl D. Friedman
Assistant Examiner—Steve Varner
(74) Attorney, Agent, or Firm—Birch Stewart Kolasch & Birch; Thomas M. Small

(57) ABSTRACT

A vehicle window assembly including a protective transparent plastic window liner covering the inner side of the glass pane and held removably in place by flexible liner-retaining strips having quarter-round molding portions overlying the margins of the liner and anchor portions that are releasably secured in mounting grooves along the edge portions of the window pane. The anchor portions are integral with the molding portions and are pressed into the grooves past detent ribs that lock the strips releasably in place, to secure the window liner against easy removal by a passenger but permitting removal by service personnel for replacement. The mounting grooves are in elongated window-retaining bars that are positioned against the inner side of the pane and also are removably secured in place for ease of reglazing, having enlarged deformable anchors pressed into locking grooves with restricted open sides forming releasable tongue-and-groove connections for removal by tilting of the bars. An alternative embodiment combines the liner-retaining strip with the window-retaining strip joined by an integral hinge, with a locking strip for holding the molding strip against the window liner.

30 Claims, 5 Drawing Sheets

WINDOW ASSEMBLY

REFERENCE TO PRIOR PROVISIONAL APPLICATION

This application claims the benefit of prior copending provisional application No. 60/325,686 filed Sep. 27, 2001.

BACKGROUND OF THE INVENTION

This invention relates to window assemblies for use in motor vehicles and the like, and relates more particularly to the protection of window panes in such vehicles against graffiti and other vandalism by transparent sheets serving as window liners to cover the windows in use and to be removable and replaceable when defaced.

Such window liners are specially designed for use on the insides of windows of public transportation vehicles such as busses and trains, where passengers sometimes scratch, paint or otherwise vandalize and deface the windows while riding in the vehicle. When windows are covered by protective liners, substantial savings are realized by replacing the liners, when necessary, to renew the windows at costs that are much less than the costs of removing and replacing, or even cleaning, the window panes themselves. It is important that the liners be mounted in a manner such that they are not easily removed by passengers but are relatively easy for service personnel to change with proper tools.

An example of a prior liner for these purposes is shown in U.S. Pat. No. 5,242,207, wherein a protective acrylic sheet is held removably in place over the interior of a window by a U-shaped frame or bracket that is attached to the permanent window frame along three sides of the window. This permits insertion of a liner sheet through the open side of the bracket into overlying relation with the window pane, and a fourth frame piece or bracket then is fixed in place over the open side with tamper-resistant screws which prevent removal of the liner by passengers in the vehicle. The brackets cover the peripheral edges of the liner to make access to the edges very difficult, except with special tools used by service personnel. With such tools, however, the protective liners may be replaced when needed at costs much lower than the costs of replacing window panes, and without necessity of removing the panes during the process.

SUMMARY OF THE PRESENT INVENTION

The present invention resides in a novel window assembly for protecting the window pane from vandalism, wherein the window liner is held in place by liner-retaining strips that are removably installed in mounting grooves along the inner side of the window frame along the edges of the pane and have liner-retaining portions disposed outside the grooves to overlie the adjacent edge portions of the liner sheet. The strips are positioned along the frame and have anchor portions that are seated in the grooves after the liner sheet is in place, being locked in place with sufficient force to prevent easy removal by an occupant of the vehicle. Also, the strips are shaped and positioned to make gripping of the installed strips difficult for such occupants.

For these purposes, the liner-retaining strip of the invention has an external portion that forms a molding for overlying the edge portion of the liner sheet, preferably with the appearance of a common "quarter round" molding, and a deformable "anchor" portion that is pressed into and releasably secured in the mounting groove. The groove is formed with a restricted open side bordered by a detent rib having a locking shoulder, and the anchor portion is formed as an enlarged, deformable anchor and is joined to the external portion by a locking joint that interlocks with the locking shoulder of the groove. To maintain secure pressure of the external molding portion with the liner sheet, the strip is installed with the locking joint pre-stressed to press the molding portion against the liner sheet. It is preferred that the molding portion be long enough to engage the window pane if, for any reason, a liner sheet is not in place over the window. Several different configurations of liner strips are possible, the presently preferred strip being generally "C" shaped in transverse cross-section when relaxed, with a locking groove on its concave side to interfit with the locking shoulder in the groove in the frame. The preferred materials for the liner-retaining strips are resiliently flexible plastic, such as soft vinyl.

In accordance with another aspect of the invention, the frame mounting grooves are formed in elongated window-retaining strips that extend along the side portions of the window pane, close to the positions of the edges of the liner sheet, and are made easily installable and removable in a novel manner for ease of reglazing the window in the field. For this purpose, the window-retaining bars are positioned against the inner side edge portions of the window pane with the liner-retaining grooves in the exposed sides of the bars that face toward the glazed area of the window so as to extend along the margins of the exposed glass, and are secured to the frame of the window assembly by interlocking tongue-and-groove connectors that can be press-fitted together and are disengageable by skilled service personnel through a special, tilting manipulation.

The preferred embodiment of the interlocking tongue-and-groove joint is a locking groove in the window frame behind the window-retainer bar having a restricted open side bordered by a detent rib having a locking shoulder, similar to the locking shoulders for the liner-retaining strips, and an enlarged, deformable anchor portion forming an interlocking tongue. For considerably greater holding strength than is provided by the anchors on the liner, however, these anchor portions are resiliently flexible "positive locking" elements in the form of J-shaped, hard plastic tongues, such as rigid PVC or neoprene, that can be pressed into the grooves and then snap-lock into engagement with the locking shoulders. Removal requires special bodily tilting of the bars to disengage the tongues from the shoulders for removal of the bars during reglazing.

An alternative embodiment of the invention combines the resiliently flexible liner-retaining strips with the window-retaining bars in one elongated, integrally formed strip assembly capable of being installed in locking grooves formed directly in the window frame, so that the liner-retaining strips are readied for engagement with a window liner as an incident to the installation of the window-retaining in the window frame against a window pane. This alternative embodiment includes a locking strip for installation in the liner-retaining strips after a window liner is in place, and operable to hold the liner-retaining strip tightly against the window liner in service use.

Various other aspects and advantages of the invention will become apparent from the following detailed description, taken in conjunction with the accompanying drawings.

DETAILED DESCRIPTION OF THE PREFERRED EMBODIMENTS (FIGS. 1–6)

Figure 1:
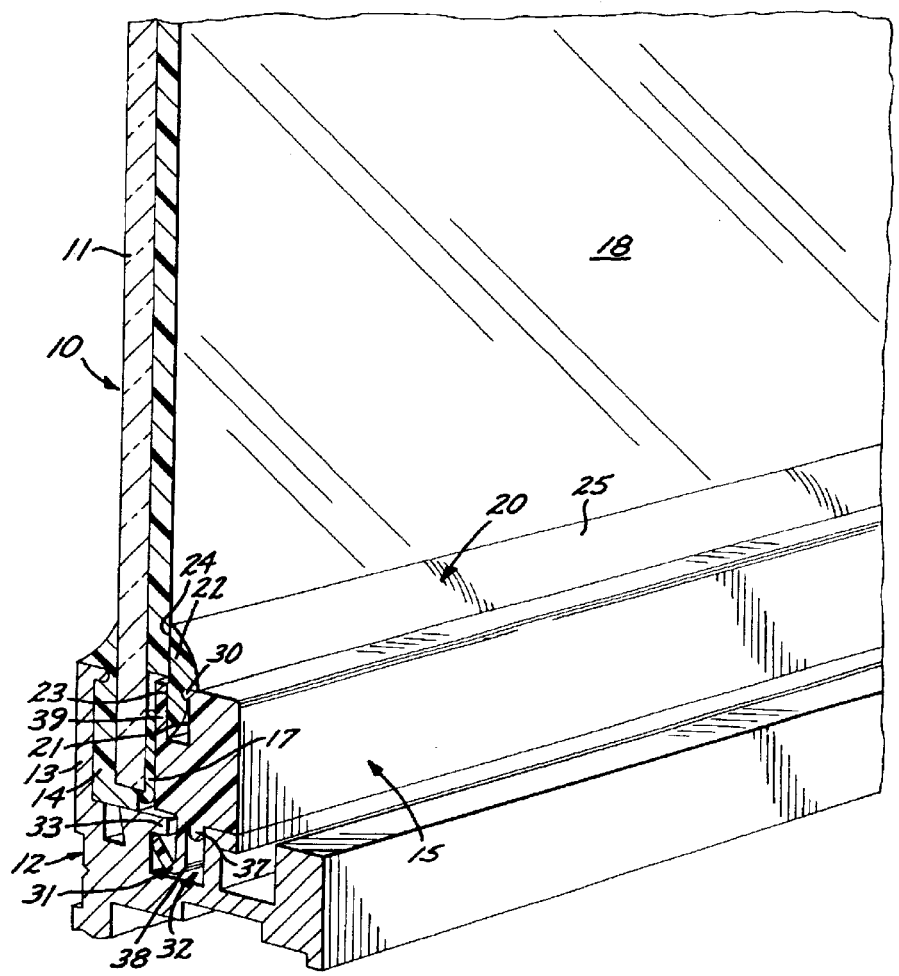
FIG. 1 is a fragmentary front perspective view, partly shown in cross-section, of a window assembly embodying the novel features of the present invention, including a window liner covering the inner side of a window pane installed in a frame in an opening in a wall of an illustrative vehicle.

As shown in FIGS. 1 through 6 for purposes of illustration, the presently preferred embodiment of the invention is a window assembly, indicated generally by the reference number 10, having a window pane 11 that is mounted in a window frame 12 and installed in a wall of a vehicle (not shown), only the frame being shown in the drawings. It is to be understood that the wall structure is conventional and typically surrounds the window assembly, defining an opening that receives a framed rectangular window assembly, as also is shown in the aforementioned patent.

The illustrative window frame 12 surrounds the window pane 11, on four sides in a rectangular window assembly, and has a retaining element 13 on one side, typically the outside, for preventing movement of the window pane outwardly from the frame. Herein, this element 13 is a fixed flange on the peripheral frame element, and confines the marginal portion of the window pane 11 in the frame. An external seal 14 is provided, preferably as a layer of vinyl applied along the inside of the flange 13 before the window pane is set into the frame. Only one representative side of the frame 12 is shown, the other sides typically being the same.

On the inner side of the window pane 11 are second window-retaining elements 15, which are pressed against the inner marginal portions of the pane to hold it securely in the frame 12. As will be described in more detail, these elements are elongated bars that are secured to the frame, with a seal 17 disposed between each bar and the window pane 11. In this manner, the pane is securely clamped in the window frame 12.

To protect the inner side of the window pane 11 against vandalism, a protective liner 18 is placed over the window pane to cover the entire exposed inner side of the pane. Typically, such a liner is a sheet of acrylic or other flexible plastic material, which is less expensive than glass for purposes of replacement and restoration of the condition of the window. Such liner sheets are suitably secured over the window pane so as to be protected against easy removal by vandals and others, but to be removable for replacement when a fresh surface is needed.

In accordance with an important aspect of the present invention, the protective window liner 18 is held in place over the window pane 11 by liner-retaining strips 20 that are removably installed in mounting grooves 21 that are formed in the inside window retaining 15 and have liner-retaining portions 22 outside the grooves to overlie the adjacent marginal or edge portions of the liner sheet 18. The strips are composed of resiliently flexible material and have anchor portions 23 that can be pressed into the grooves 21 after the liner 10 is in place over the window pane 11. When locked in place, the strips are secured to the frame in a manner that prevents easy or casual removal by a typical occupant of the vehicle.

Figure 2:
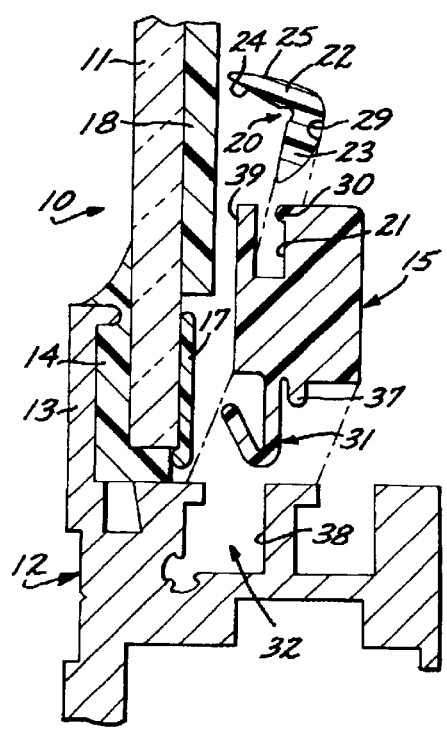
FIG. 2 is a fragmentary cross-sectional view of the window in FIG. 1 with parts in exploded, moved positions before installation of the window-retaining bar and the liner-retaining strip, the latter being in the removed and relaxed condition.
Figure 3:
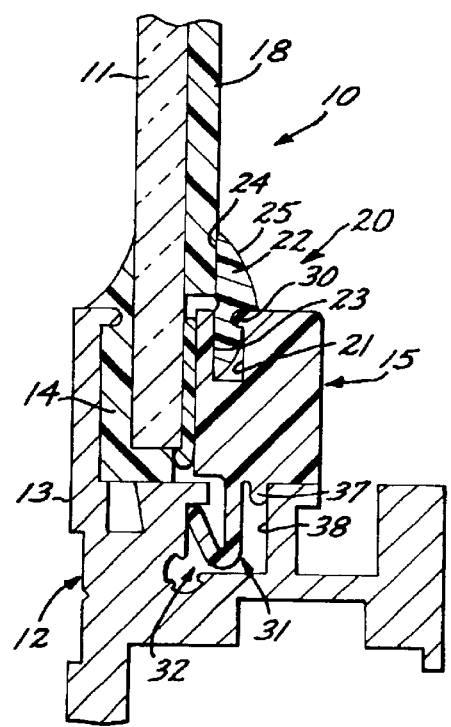
FIG. 3 is a fragmentary cross-sectional view similar to FIG. 2 with the parts fully installed, as in FIG. 1.

As shown most clearly in FIGS. 1 and 2, the liner-retaining strip of the invention is an elongated, molded part, preferably composed of soft vinyl or the like and having an external molding portion 22 with a flat side 24 (FIG. 2) for engaging the liner and a convexly rounded outer side 25. As seen in FIGS. 1 and 3, this outer side forms a quarter-rounded surface on the strip after installation. The anchor portion 23 of the strip 20 has a flat inner side 27 (FIG. 2) and a convexly rounded side 28, and is sized at its thickest portion to fit tightly in the groove 21 as shown in FIGS. 1 and 3. A locking groove 29 is provided to lie at the restricted open side of the groove, and herein faces away from the flat side. This groove forms a hinge in the strip 20 between the molding portion 28 and the anchor portion 22. A suitable material for the liner-retaining strip is Vinyl Geon 8477, A 80–85 Shore.

To lock the anchor portion 23 in the groove 21, a retaining rib 30 is formed on the wall of the groove along its open side, so that the underside of the rib (as viewed in these drawings) forms an abutment shoulder for interfitting with the locking groove 29 in the strip 20. The rib and the strip preferably are complementary in shape, for a snug fit. The enlarged anchor portion can be pressed into the groove through the restricted open side, and then will expand in the groove to secure the strip to the frame element 15. At the same time, the strip can be removed by service personnel who can gain access to a portion of the strip with a suitable tool and pull the anchor portion out of the locking groove by applying sufficient force to deform the anchor portion around the retaining rib 30.

It will be seen in FIG. 2 that the relaxed condition of the strip 20 is C-shaped in cross-section, and that the molding portion is inclined toward the window pane 11 prior to installation. The length of the molding preferably is sufficient to reach the pane 11 if there is no liner 18, thus covering or closing the space between frame element 15 and the pane. When a liner 18 is in place, however, the molding portion flexes into the position shown in FIGS. 1 and 2, pressed tightly against the liner. It is to be understood that liner-retaining strips are to be installed on all sides of the window with their ends butted together at the corners.

In accordance with another aspect of the invention, each of the frame elements 15 for retaining the window pane 11 in the frame 12 is an elongated bar that has the restricted groove 21 on one side, to face toward the glazed area of the window when installed along one side portion of the pane, and is secured to the frame by interlocking tongue-and-groove connectors 31 and 32 that are press-fitted together to attach the bar securely to the frame but are disengageable through a special manipulation procedure. This secures the pane firmly in the frame but makes possible the reglazing of the window, in the field or in the shop, in a relatively simple and inexpensive manner.

As shown in FIGS. 1, 2 and 3, the connectors 31 and 32 comprise, respectively, a positive-locking "tongue" retainer on the side of the bar 15 opposite the groove 21, that is J-shaped in cross-section and capable of flexing to a reduced effective thickness, and a groove 32 having an open side that is restricted by a rib 33 to a width less than that of the "J" and providing a downwardly facing shoulder 34 for engagement with the upwardly facing end 35 of the "J". A depending rib 37 on the bar, beside the tongue 31, is positioned to engage the sidewall 38 of the groove 32 and hold the bar 15 firmly against displacement away from the window pane, with the tongue 31 confined beneath the rib 33.

The bar 15 and the integral tongue 31 and rib 37 are composed of relatively stiff and rigid, but somewhat resiliently flexible, material such as PVC or neoprene, one suitable material being "EPDM-Dense, Black." This permits the tongue to be made thin enough to be flexible for insertion of the "J" in the restricted groove 32, and stiff enough to hold the bar 15 securely in place when the tongue 31 is set in the groove.

As shown in FIG. 2, the bar 15 is positioned over the groove 32 when the window pane 11 has been installed in the frame 12 and the seal 14 has been applied, and is pressed toward the groove to insert the tongue 31 therein. Since the tongue is wider than the mouth of the groove, it flexes to a smaller effective width to pass through the groove, and then snaps into the interlocking position beneath the rib 33. The free end portion of the "J" is inclined to one side, the left in FIG. 2, to form a wedge shape for a camming action during insertion. After the bar 15 is in place, the liner 18 may be applied to the window pane and the liner-retaining strip 29 may be installed in the groove 21. The anchor portion 23 is forced into the groove in the direction indicated in FIG. 6, either manually or using a suitable tool (not shown), and expands in the groove to lock the liner-retaining strip 20 in place over the adjacent edge portion of the liner 18.

Figure 4:
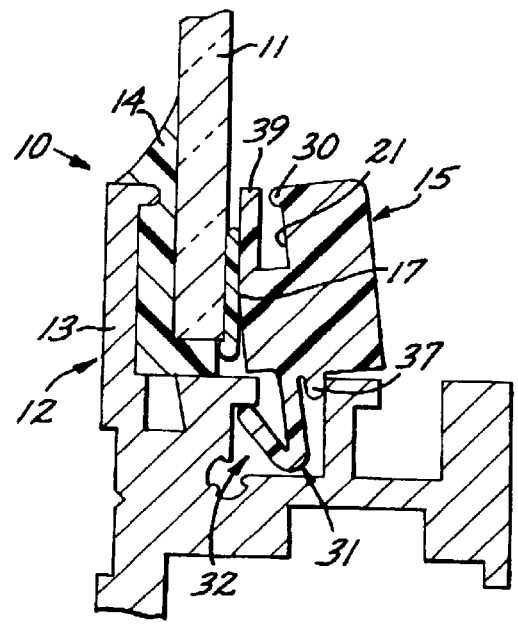
FIG. 4 is a view of the window assembly, with the window liner sheet and the liner-retaining strip removed, showing the window-retaining bar tilted for disengagement from the frame.
Figure 5:
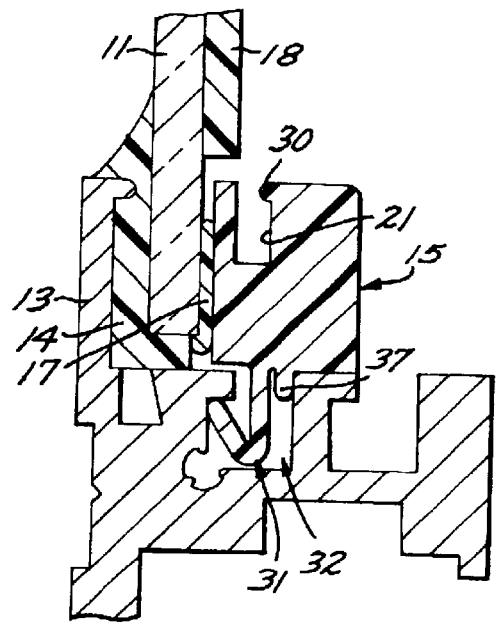
FIG. 5 is a view similar to FIG. 4 with the window-retaining bar secured to the frame and showing a portion of a window-liner sheet in place against the inside of the window pane.
Figure 6:
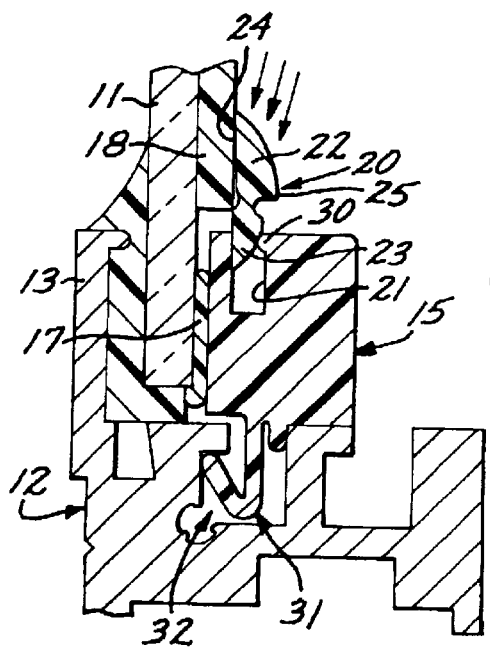
FIG. 6 is a view similar to FIG. 5 showing a position of the liner-retaining strip during installation in a window-retaining bar, with arrows showing the direction of installation.

Removal of the frame 15 for reglazing of the window 10 is accomplished in the manner shown in FIG. 4, by tilting the bar toward the window pane 11, as permitted by flexing of the sidewall 39 of the groove 21. This tilting movement is sufficient to lift the retaining rib 37 out of the frame groove 32, permitting the tongue 31 to be pulled from the groove without damaging the tongue. Thus, in the case of a broken or otherwise damaged window pane 11, the four frame-retaining bars 15 can be removed to permit replacement of the pane, and then re-installed to hold the new pane in place.

Of course, a window liner 18 can be applied over the new pane 11 and secured in place by liner-retaining strips 20 along all four sides of the pane.

Description of the Alternative Embodiment (FIGS. 7–11)

Shown in FIGS. 7 to 11 is an alternative embodiment of the invention that provides an elongated one-piece window- and liner-retaining element 40 for each side of the window pane, corresponding parts of the element 40 being shown with corresponding primed reference numbers and the window parts that are the same as in the first embodiment being shown with the same reference numbers. This embodiment is functionally the same as the first embodiment, except that the liner-retaining strip 20' is integrally and flexibly joined to an elongated bar 15' of relatively thick and firm plastic capable of holding a window pane in place, similar to the window-retaining bar 15, and the groove 21 for receiving the anchor 23 in the first embodiment is replaced by a positioning groove 21' for receiving a hinged locking plug or insert 23' on the bar 15'. In effect, the window-retaining bar is incorporated as the base of the liner-retaining strip and both are joined to the frame by a single releasable connection. The seal strip 38 of the first embodiment may be omitted because softer material is used for the bar 15' than is used for the bar 15.

Figures 7, 8:
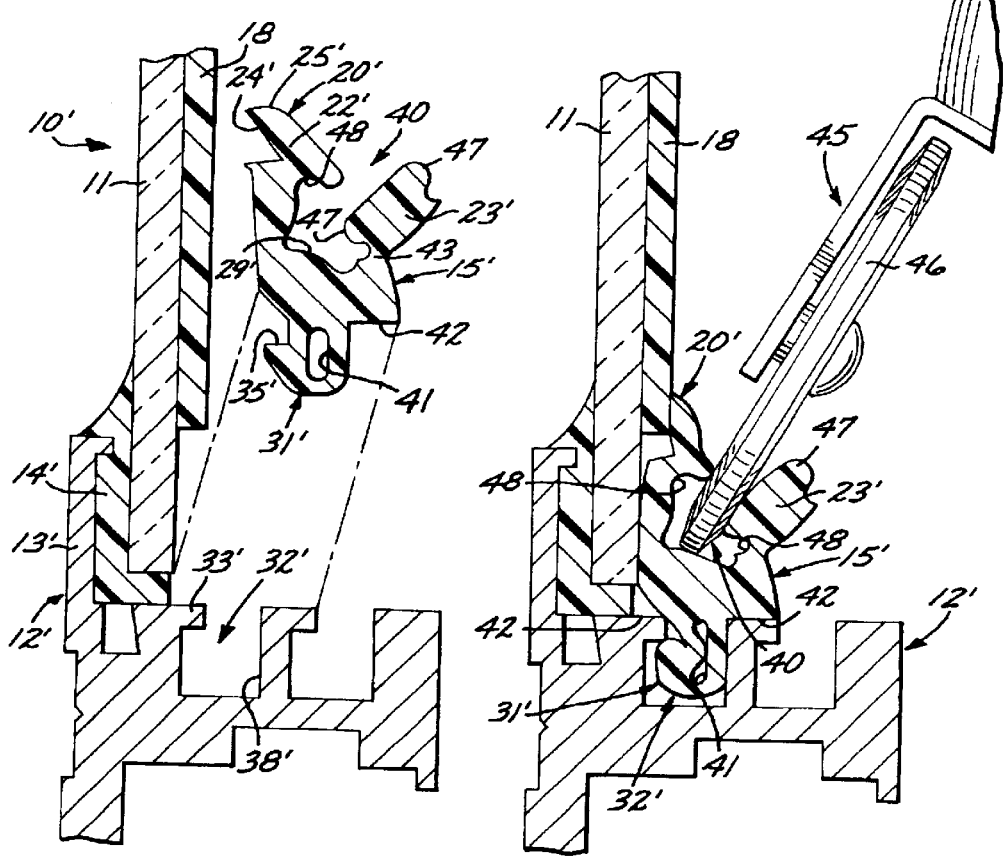
FIG. 7 is a fragmentary cross-sectional view similar to FIG. 2 showing an alternative embodiment of the invention in which a window-retaining bar and a liner-retaining strip are combined in a integrally formed element having a selectively engageable and disengageable liner-retaining strip, shown before installation of the element on the window frame.
FIG. 8 is a view similar to FIG. 7, with the window-retaining element in the process of being forced into the mounting groove in the window frame by a rolling tool, shown in side elevation and broken away for compactness.
Figure 9:
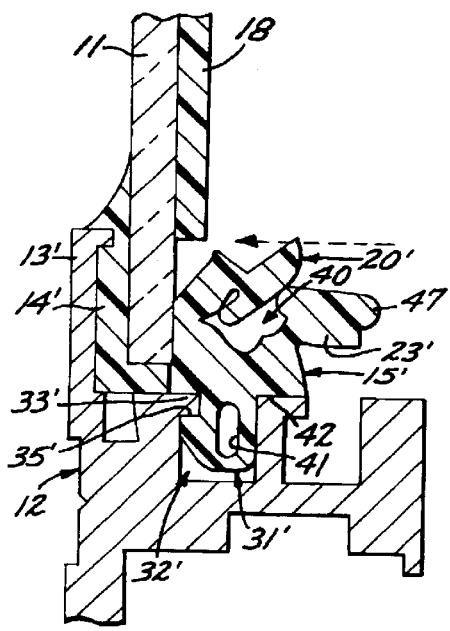
FIG. 9 is a view similar to FIG. 8 showing the window-retaining element in place and the liner-retaining strip in an intermediate condition before final positioning.

As can be seen most clearly in FIG. 7, the element 40 has a depending tongue 31' that is generally J-shaped, with a lateral projection formed with a shoulder 35' for abutting against and interlocking with the shoulder 34 of the groove 32. The tongue has a lateral thickness approximately equal to the width of the groove beneath the shoulder 35', so as to fit tightly in the groove 32, and is formed with a hollow center 41 to make the tongue collapsible, in a manner generally similar to the flexing of the tongue 35.

Figure 10:
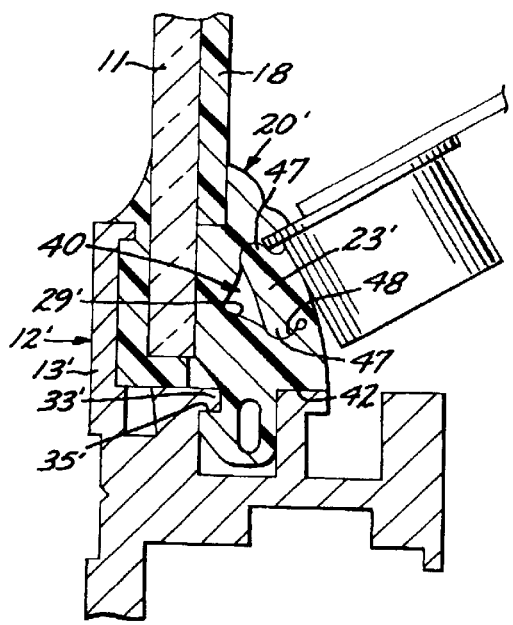
FIG. 10 is a view similar to FIG. 9 showing the liner-retaining strip with a special locking strip being pressed into the final condition by a second rolling tool, shown in side elevation and broken away for compactness.
Figure 11:
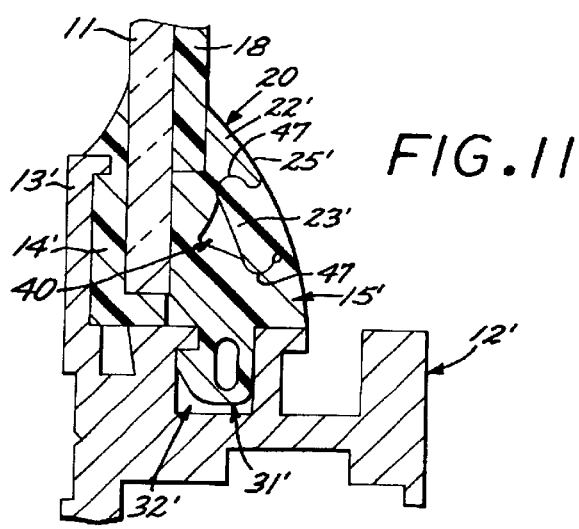
FIG. 11 is a view similar to FIG. 10 showing the completed assembly.

The window-retaining bar 15' of the retaining element 40, as best seen in the installed condition in FIG. 10, has a lower side 42 that engages the top of the window frame 12 on one side of the groove 32, to locate the bar portion on the frame, and carries the liner-retaining molding strip 22' along its opposite side. This strip is joined to the bar portion 15' by a flexible hinge formed along a groove 29' in the exposed side of the bar beneath the molding portion 22'. In this instance, however, the groove is designed to receive the locking plug 23', which is an elongated strip that is joined to the body of the bar 15' by an integral hinge along the lower edge of the groove 29'.

FIG. 7 shows the relaxed condition of the entire retaining element 40, in position to be installed along one side of the frame 12 and against the adjacent edge portion of the window pane 11, beneath the edge of the window liner 18. A notch 44 is formed in the side of the strip 22' facing the window and positioned to provide clearance beneath the edge of the liner, and the tongue 31' is positioned for insertion in the groove 32' in the frame 12. From this position, the retaining element 40 is installed in the frame by pressing it toward the groove 32' and inserting the tongue 31' into the groove. To facilitate such installation, a roller tool 45 can be used in the manner shown in FIG. 8, placing the roller 46 of the tool in the groove 29' above the tongue 31' and applying pressure while moving the tool along the groove. This forces the retaining element into place in the manner shown in FIG. 8, and leaves it in the condition shown in FIG. 9, wherein it can be seen that the strip 22' is left in an "open" position spaced from the window liner 18. To complete the installation of the strip 20', the strip 22' is pressed into holding engagement with the window liner and secured in place by the locking plug strip 23'. This is accomplished by folding the plug strip over the groove 29' and pressing it into place in the groove. Locking ears 47 on the plug strip are forced into locking channels 48 in the sides of the groove and thereafter hold the plug strip in place. At the same time, the plug strip forces the molding strip into tight contact with the liner, as shown in FIG. 10.

This operation can be facilitated by using a rolling tool 49 as shown in FIG. 10, with a wide roller 50 designed to roll along the outer side of the plug strip 22' and force it progressively into the groove 29' along the full length of the retaining element 20'. When the insertion is completed, the exposed side of the combined window- and liner-retaining element 20' has the appearance shown in FIG. 11. This preferably is a smooth convex curve from the frame 12 to the liner, to have the appearance of a conventional molding strip along the side of the window. This also makes the locking plug strip virtually inaccessible to the passengers on the vehicle. A suitable material for this retaining element is EPDM-Dense, preferably black, with a Shore hardness on the order of 65 to 75 Duro, for sufficient structural strength and, at the same time, sufficient flexibility in the hinges.

Accordingly, it will be seen that the present invention provides a novel liner-retaining strip for window assemblies wherein a protective window liner is applied to one side of the window, and makes it possible to retain such a liner in place in a manner that is relatively quick and easy to install and also is removable by trained service personnel to permit removal of a defaced liner sheet and substitution of a clean liner. The invention also provides novel window-retaining elements that are removably secured to the frame of the window to hold the window pane in place, and are readily removable by trained service personnel for reglazing of windows in the field or in the shop.

I claim as my invention:

1. A window assembly for use in a wall of a vehicle, comprising:
    a window frame mountable in the vehicle wall and defining a window opening;
    a window pane fitted in and substantially filling the window opening;
    window-retaining bars fitted in the window opening on one side of the window pane and overlying marginal portions of the pane to hold it in the window frame, said bars having detent grooves extending along said bars adjacent to the window pane;
    releasable couplings between said bars and said frame holding the bars in place to secure the window pane in the frame;
    a window liner disposed against and substantially covering said one side of the window pane and having marginal portions adjacent to said bars;
    and elongated, resiliently flexible liner-retaining strips having resiliently compressible anchor portions confined in said grooves and thereby releasably secured to said bars, and molding portions disposed outside said grooves and overlying said marginal portions of said liner, said molding portions being pressed against said marginal portions to hold the liner against the window pane.

2. A window assembly as defined in claim 1 wherein said detent grooves are formed with restricted open sides and said anchor portions are larger than said restricted open sides, to be compressed and pressed into said grooves during assembly of the strips onto said bars.

3. A window assembly as defined in claim 2 wherein said molding portions have flat sides pressed against the window liner and convex, approximately quarter-round opposite sides to resemble conventional moldings when installed.

4. A window assembly as defined in claim 1 wherein said molding portions are joined to said anchor portions by integral flexible hinges, and said hinges are stressed to hold said molding portions tightly against the liner.

5. A window assembly as defined in claim 4 wherein said liner-retaining strips are generally C-shaped in cross-section when relaxed, and have locking grooves on one side forming said hinges between said anchor portions and said molding portions, said are generally C-shaped in cross-section when relaxed, and have locking grooves on one side forming said hinges between said anchor portions and said molding portions, said detent grooves having abutment shoulders in said detent grooves for interlocking with said locking grooves in said strips when said anchor portions are disposed in the detent grooves, and said strips being flexed into a straightened, stressed condition in said window assembly.

6. A window assembly as defined in claim 1 wherein said detent grooves have detent ribs extending along the open sides of the grooves and restricting said open sides, and said anchor portions are disposed in said grooves beyond said detent ribs and have interlocking shoulders abutting against said ribs, said anchor portions being resiliently deformable for insertion in and removal from the grooves.

7. A window assembly as defined in claim 6 wherein said interlocking shoulders on said anchor portions are walls of grooves in said strips that interlock with said ribs.

8. A window assembly as defined in claim 7 wherein said releasable couplings comprise tongue-and-groove connections between said bars and said frame, and wherein the tongues and the grooves have interlocking opposed abutments composed of resiliently flexible material to be forced into and out of coupled relation.

9. A rectangular window assembly for use in a wall of a vehicle, comprising:
    a window frame mountable in the vehicle wall and defining a generally rectangular window opening;
    a generally rectangular window pane fitted in and substantially filling said window opening;
    said frame having a first window pane retainer on one side of said window pane for overlying marginal portions of the window pane and preventing movement of the window pane out of the window frame through said one side and being open on the other side for installation of the pane in said opening through said other side;
    window retaining bars overlying the marginal portions of said window pane on said other side to block removal of the window pane from said other side while the bars are in place;
    releasable connectors acting between said bars and said frame to hold said bars in place in the frame, thereby securing said window pane in the frame;
    a rectangular window liner smaller than said window pane and sized for installation into the frame from said other side over said bars and into overlying relation with the portion of the window pane bounded by the bars with the peripheral edges of the window liner closely adjacent to the bars;
    liner-retaining strips overlying and covering marginal portions of the window liner along said bars; and
    couplings for holding said liner strips releasably on said bars comprising anchors on said strips extending toward the bars, detents on the bars for receiving and holding the anchors, and resiliently flexible hinges between the strips and the anchors normally holding the strips against the window liner and permitting swinging of the strips away from the window liner;

whereby the window pane may be installed in the frame before the bars are in place, and are securely held in place after the bars are installed, and the window liner may be installed over the bars and subsequently held in place by the liner retaining strips.

10. A window assembly as defined in claim 9 wherein said releasable connectors between said bars and said frame comprise spring latches on said bars releasably engaged in detent recesses in said frame.

11. A window assembly as defined in claim 10 wherein said spring latches are resiliently flexible tongues on said bars extending into said detent recesses and having latching fingers in said recesses, and said detent recesses have latching shoulders normally engaged with said latching fingers, said fingers being disengageable from said shoulders to release said bars by flexing of said tongues.

12. A window assembly as defined in claim 11 wherein said detent recesses are grooves in said bars and said latching shoulders are formed on ribs partially closing said grooves.

13. A window assembly as defined in claim 9 wherein said liner-retaining strips, said anchors and said hinges are formed as elongated integrally joined strips and are composed of resiliently flexible material.

14. A window assembly as defined in claim 13 wherein each of said elongated integrally joined strips is generally C-shaped in cross-sectional shape when relaxed with a mid-portion of reduced thickness forming the hinge.

15. A window assembly as defined in claim 14 wherein the detents of the retainer bars are elongated detent grooves having open sides facing toward the liner retainer strips, and having detent shoulders along said open sides.

16. A window assembly as defined in claim 15 wherein said portion of reduced thickness forms a detent shoulder on said elongated strip for locking the anchor of the strip in the detent groove of the bar.

17. A window assembly for use in a wall of a vehicle, comprising:
   a window frame mountable in the vehicle wall and defining a window opening;
   a window pane fitted in and substantially filling said window opening;
   said frame having first window pane retainers on one side for overlying marginal portions of the window pane and preventing movement of the window pane out of the window frame through said one side, said frame being open on the other side for installation of the pane in said opening through said other side;
   second window pane retainers releasably secured to said window frame around said window pane on said other side and positioned to overlie the marginal portions of the pane to secure the window pane in said window opening against movement out of the window frame through said other side when said second retainers are in place;
   a window liner smaller than said window pane and sized for insertion into the frame from said other side over said second retainers;
   liner-retaining strips extending along said second retainers and overlying the marginal portions of the window liner on said other side;
   and joints between said strips and said second retainers positioning said strips in holding engagement with the window liner when the latter has been placed against the window;
   whereby the window pane may be installed in the window frame when the second retainers are released and removed and are secured in place when the second retainers are in place, and the window liner may be installed over the second retainers, held removably in place by the liner retaining strips and removed without removal of the second retainers.

18. A window assembly as defined in claim 17 wherein said retainers are elongated bars and selectively releasable tongue-and-groove couplings between said second retainers and said frame.

19. A window assembly as defined in claim 18 wherein said couplings comprise elongated resiliently flexible webs on one side of each of said second retainers having a generally J-shaped cross-sectional shape, and elongated grooves in said frame along said one side of said second retainers receiving said webs, detent ribs partially closing said grooves and forming abutments for holding said webs in said grooves, said webs being stiff enough to resist direct removal of the webs from the grooves but capable of flexing upon tilting of said retainers for removal of the second retainers.

20. A window assembly as defined in claim 19 further including a short positioning rib on each second retainer extending into the groove in the frame and engaging the wall of the groove opposite the detent rib, to be pulled from the groove upon tilting of the second retainer thereby to release the second retainer from the frame.

21. A window assembly as defined in claim 17 wherein said liner-retaining strips comprise elongated resiliently flexible molding portions pressed against the marginal portions of the window liner, and said joints comprise restricted detent grooves in said second retainers in the sides thereof opposite the frame, resiliently flexible anchors confined in said grooves, and resiliently flexible hinges integrally joining said anchors to said molding portions and stressed to press the molding portions tightly against said window liner.

22. A window assembly as defined in claim 21 wherein said molding portions, said anchors and said hinges are molded integrally as one-piece moldings of the same resiliently flexible and compressible material.

23. A window assembly as defined in claim 22 wherein each of said one-piece moldings is C-shaped in cross-sectional shape when relaxed, and is straightened and stressed when installed.

24. A window assembly as defined in claim 21 wherein said hinges are formed by locking grooves in said one-piece moldings reducing the thickness between said molding portions and said anchors and providing locking shoulders for engaging said detent grooves.

25. A window assembly as defined in claim 17 wherein said second retainers, said liner-retaining strips, and said couplings are one-piece integral moldings, said window pane retainers being elongated bars of relatively thick and firm plastic and said liner-retaining strips being integrally and flexibly connected to said bars by flexible hinges.

26. A window assembly as defined in claim 25 wherein said retainers are joined to said frame by selectively releasable tongue-and-groove couplings between said second retainers and said frame, and the tongues of said couplings are integrally joined to said second retainers.

27. A window assembly as defined in claim 26 wherein said tongues are generally J-shaped lateral projections for substantially filling the grooves of the tongue-and-groove couplings and composed of resiliently flexible material, and having a locking shoulder on one side for engagement in the groove.

28. A window assembly as defined in claim 25 wherein said liner-retaining strips extend from said second retainers toward the window pane and are stressed to be pressed tightly against the window liner.

29. A window assembly as defined in claim 28 wherein said one-piece integral moldings have positioning grooves between said strips and said second retainers, and further including a locking plug pressed into each groove and pressing the strip against the window liner.

30. A window assembly as defined in claim 29 wherein said plug is an elongated plug strip molded integrally with the one-piece molding along the positioning groove, and sized to overfill the positioning groove.

* * * * *